United States Patent [19]
Bolton

[11] 4,263,726
[45] Apr. 28, 1981

[54] VISUAL DISPLAY APPARATUS

[75] Inventor: Martin J. P. Bolton, Crawley, England

[73] Assignee: Redifon Simulation Limited, Crawley, England

[21] Appl. No.: 29,467

[22] Filed: Apr. 12, 1979

[30] Foreign Application Priority Data

Apr. 22, 1978 [GB] United Kingdom ............... 15998/78

[51] Int. Cl.³ .............................................. G09B 9/08
[52] U.S. Cl. ...................................... 434/43; 364/515; 358/104
[58] Field of Search ................. 35/10.23, 10.24, 12 N, 35/12 P; 364/515, 521, 522, 731; 358/103–105

[56] References Cited

U.S. PATENT DOCUMENTS

| | | | |
|---|---|---|---|
| 3,060,596 | 10/1962 | Tucker et al. | 35/10.24 |
| 3,401,228 | 9/1968 | Barnes | 364/522 |
| 3,580,978 | 5/1971 | Ebeling | 358/104 |
| 3,619,912 | 11/1971 | Conant et al. | 358/104 |
| 3,725,563 | 4/1973 | Woycechowsky | 364/731 |
| 3,892,051 | 7/1975 | Bunker | 358/104 |
| 3,911,597 | 10/1975 | Millard et al. | 358/104 |
| 4,016,658 | 4/1977 | Porter et al. | 35/12 N |
| 4,078,317 | 3/1978 | Wheatley et al. | 358/104 |
| 4,152,766 | 5/1979 | Osofsky et al. | 364/515 |

*Primary Examiner*—Charles E. Atkinson
*Assistant Examiner*—Gary Chin
*Attorney, Agent, or Firm*—Larson, Taylor and Hinds

[57] ABSTRACT

Visual display apparatus for ground-based craft flight simulation apparatus using a raster scan display for viewing by the trainee pilot and providing an image comprising a target or other craft, together with cloud extending to the simulated horizon. The cloud image part has repetitively patterned features and is displayed in correct perspective, according to the simulated flight position relatively thereto, for providing speed and altitude cues. This part of the image is provided by digital means, a single cycle of the repetitive pattern being held in a digital store and perspective being computed continuously. The whole apparatus includes three generators providing respectively sky, horizon and patterned cloud surface all controlled by a general purpose computer receiving flight data from the simulator flight computer. Outputs from the three generators are selected appropriately during the raster scan of the display and also appropriately combined with a high-definition image of the target or other craft.

6 Claims, 19 Drawing Figures

VISUAL DISPLAY APPARATUS

This invention relates to visual display apparatus for ground-based craft flight simulation apparatus.

It is well-known in ground-based craft flight simulators to provide, for the trainee pilot, a visual display simulating terrain or cloud overflown during the exercise.

One known method for providing the required visual display is an analogue method using a scale model of the terrain or cloud formation being overflown, an optical probe which is moved over the model correspondingly to the craft flight simulated, a closed-circuit television camera upon the photosensitive surface of which is imaged the view seen by the optical probe and a television monitor which is viewed by the trainee pilot. In such apparatus, the model is viewed in perspective by the optical probe and therefore is displayed in perspective. One example of such apparatus is described in British Pat. No. 926,271.

According to a second known analogue method, a motion picture is recorded by a craft in actual flight and is displayed to the trainee pilot in a flight simulator during simulated flight. Small differences between the actual recording flight and the simulated flight are simulated by distortion of the image displayed. One example of such apparatus is described in U.S. Pat. No. 3,233,508.

According to a third known analogue method, an image is generated by scanning a photographic transparency which is a plan view of the terrain or cloud to be displayed. With an image in this manner, it is necessary to create the viewing perspective in accordance with the heading and position of the simulated craft. One example of such apparatus is described in U.S. Pat. No. 3,060,596.

A fourth known method is a digital method in which image information is stored in a computer to provide a computer-generated image (C.G.I.). By this method, it is necessary to compute the perspective, so that the displayed image correctly simulates the craft position relatively to the surface viewed, during the simulated flight. The technique of perspective transformation required and the equations for continuous calculation during simulated flight are known. One example of such apparatus is described in U.S. Pat. No. 3,725,563.

The present invention is particularly concerned with a visual display appropriate to in-flight aircraft exercises, such as aerial combat or in-flight refuelling, and is further concerned to provide a part of the display by an image which is computer-stored as to its information and computed as to its perspective.

The visual display in a flight simulator for aerial combat or for in-flight refuelling needs to present to the trainee pilot two image components. The first component is the image of the other aircraft concerned, target or tanker. This component needs to be presented in high detail. Apparatus, of the scale model and closed-circuit television type, for providing this component of the visual display is described in British patent application No. 1,449,881.

The second image component represents the overflown terrain or cloud, which image merges with the sky at the simulated horizon. This terrain or cloud image serves to provide altitude and speed cues to the trainee pilot but does not have to be of high detail and may consist of an image of a repetitively patterned surface. This image component may be produced by a television camera and scale model combination or by electronic means. If it is produced by electronic methods the circuits used may be either of the analogue or of the digital kind.

Analogue methods are known for providing the terrain or cloud image component in flight simulator television displays. A commonly used technique provides the image of a featureless cloud layer and of the horizon. This form of image is unsatisfactory, as it provides no altitude and speed cues to the trainee pilot. Analogue methods which provide the image of a patterned surface suffer from problems of stability and the speed limitations of currently used components. Digital techniques for terrain image generation have produced better results, but have necessitated the use of uneconomical amounts of equipment and have suffered from the problems of Moiré patterning in the image generator design.

The object of the present invention is to provide the second said image component as a computer-stored image, the displayed image of which is computed in perspective, and one boundary of which is formed by the computed horizon in simulated flight.

Accordingly, the invention provides visual display apparatus for a ground-based craft flight simulator comprising raster scan type display means for viewing by a trainee pilot observer, synthetic image generating means for supplying to the display means a signal representing an image of sky, horizon and a simulated patterned surface extending to the horizon, said patterned surface being displayed in true perspective in accordance with the simulated altitude and position in space of the craft simulated and a general purpose programmable computer connected to interface the said flight computer and the said synthetic image generating means, said synthetic image generating means comprising a digital store for holding a single pattern cycle of a repetitive pattern for patterning the said patterned surface in one dimension thereof, a perspective computer for computing the track of a ray from the observer's eye, through the scanning spot of the display means, in its instantaneous position, and to a point of intersection on said simulated patterned surface, a computing element for providing a signal output for the display means representative of a variable brightness portion of sky and switch means for selectively supplying to the display means either the signal representative of the patterned surface or the signal representative of the variable brightness portion of sky, continuously during the raster scan of the display means.

In order that the invention may be clearly understood and readily carried into practice, one embodiment will now be described in detail, by way of example, with reference to the accompanying drawings, in which.

Figure 1:
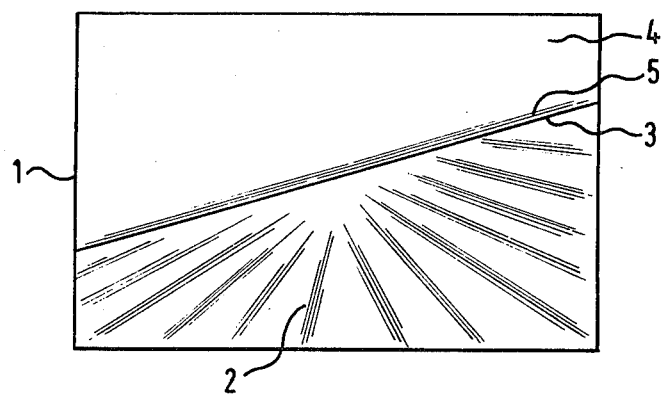
FIG. 1 is a represention of the form of image generated by the image generator and displayed by apparatus according to the present invention.

Referring now to the drawings, FIG. 1 illustrates the form of a typical simulated patterned surface produced by the image generator of the invention, wherein the boundary 1 of the display plane might be the boundary of the raster scanned image on a cathode ray tube monitor, assuming a CRT monitor to be used in the simplest form of the invention.

The representation 2 of the patterned surface extends below the simulated horizon 3 from the horizon 3 to the display boundary 1. The displayed image above the horizon 3 comprises a region 4 of fixed brightness and a region 5 of variable brightness adjacent to the horizon 3.

Figure 2:
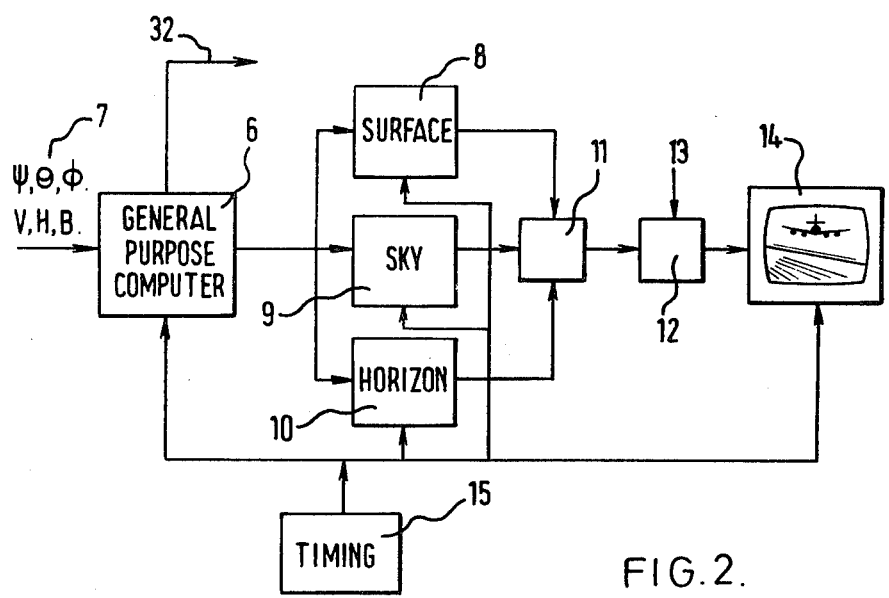
FIG. 2 is a block schematic diagram of the image generator and display monitor for displaying an image for an in-flight exercise; which includes an image of the form of FIG. 1.

FIG. 2 is a block diagram of the complete image generator used. As shown, this comprises a general purpose computer 6, together with special purpose circuits 8, 9 and 10 for generating the patterned surface, the sky and the horizon images, respectively. The general purpose computer 6 receives information indicated at 7 continuously and at a regular rate from the flight computer of the associated flight simulator. The information 7 defines the simulated aircraft attitude, given by the heading angle $\psi$, the pitch angle $\theta$ and the roll angle $\phi$, the speed v parallel to the patterned surface, the altitude H and the overall image brightness B.

The general purpose computer 6 calculates quantities which are functions of the input information 7 and supplies these quantities to the special purpose circuits 8, 9 and 10. An output switch 11 selects one of the three outputs from the circuits 8, 9 and 10 for display at any instant.

Assuming that the simulator is used for simulated inflight refuelling exercises, for example, the instantaneous image from switch 11 may be combined, in a combiner 12, with a further image 13 representing the tanker aircraft in the exercise. Such a composite image is shown in the display monitor 14 of FIG. 2.

A master timing generator 15 provides timing information to all parts of the image generator shown and to the display monitor 14, to synchronise the image generation with the television type raster scan format.

Figure 3:
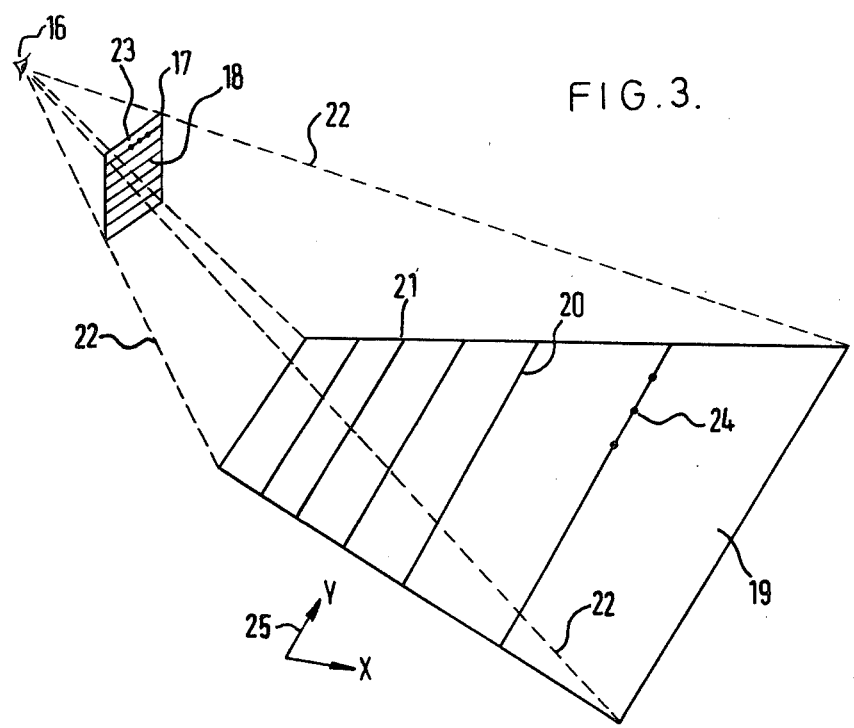
FIG. 3 represents a three-dimensional diagram explaining the projection of a raster in the display plane onto an oblique plane containing the simulated patterned surface.

FIG. 3 shows the principle of the patterned surface image generation. In FIG. 3 is shown the observer's eye point 16, the plane 17 of the display containing raster lines 18 and the plane 19 of the patterned surface viewed. Lines 22, originating at the eye point 16, project the boundary outline of the display plane 17 onto the surface 19. The shape of the projected quadrilateral 21, thus formed between the four points at which the lines 22 touch the surface 19, is in general not rectangular. The shape of the quadrilateral 21 and the simulated area enclosed thereby depend upon the separation of the plane 17 from the surface 19. This in turn depends upon the simulated altitude and simulated attitude of the simulator aircraft.

Each raster line 18 of the display in plane 17 may similarly be projected onto the surface 19 thus forming a distorted set of lines 20 each corresponding to one raster line 18. Similarly, a series of equidistantly spaced apart points 23 on a particular raster line 18 will be projected as a series of points 24 on the corresponding projected raster line 20. In general, the points 24 will not be equidistantly spaced apart along line 20, because of the distortion of the projected quadrilateral 21.

The actual positions of the points 24 can be defined with reference to a two-dimensional X, Y co-ordinate system 25, which also defines a plane in which the patterned surface 19 is assumed to lie. The positions of points 24 are evaluated by a computing circuit at the same rate as the raster line points 23 are generated and are used to access a store which holds a definition of the surface pattern as selected according to the points 24, are sent to the display monitor 14 of FIG. 2, which forms the display plane 17, FIG. 3. Because the projected points 24 are in inverse perspective relationship to the points 23, the pattern thus displayed in plane 17 is the perspective projection of the pattern defined in plane 19.

Figure 4:
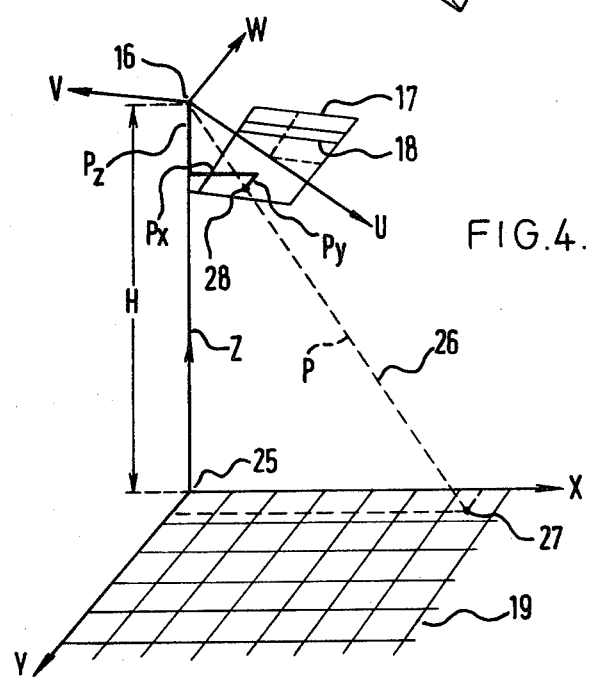
FIG. 4 represents a three-dimensional diagram explaining the geometry of the raster transformation.

FIG. 4 illustrates the geometry of the display raster of plane 17 to the plane 19 of the patterned surface, transformation. As shown, the plane 19 lies in the (X,Y) plane of the (X,Y,Z) rectangular co-ordinate system 25. A rectangular co-ordinate system (u,v,w,), used to define the relative orientation of the observer's craft, is centered at the eye point 16.

A vector P 26 defines the instantaneous position of the display raster scanning spot 28, in plane 17, and is projected to intersect plane 19 at a corresponding point 27.

If $P_z$ defines the perpendicular distance from the eye point 16 to the scanning point 28 at a given instant and in the direction parallel to the Z axis, if $P_y$ similarly defines the distance parallel to the Y axis, $P_x$ axis, and H defines the height of the eye point 16 above the surface plane 19, then:

$$X = (HP_x/P_z)$$

and $$Y = (HP_y/P_z)$$

where X and Y denote the co-ordinates of the intersection point 27 on plane 19. These values are obtained by the construction of similar triangles and are a statement of perspective division.

In general, the eye point 16 is not directly above the (X,Y,Z) co-ordinate system origin, as it is shown to be in FIG. 4. However, this fact does not invalidate the argument, since the values of X and Y are altered only by constant terms. In the special case of FIG. 4, the X,Y plane origin and the nadir point coincide.

Figure 5:
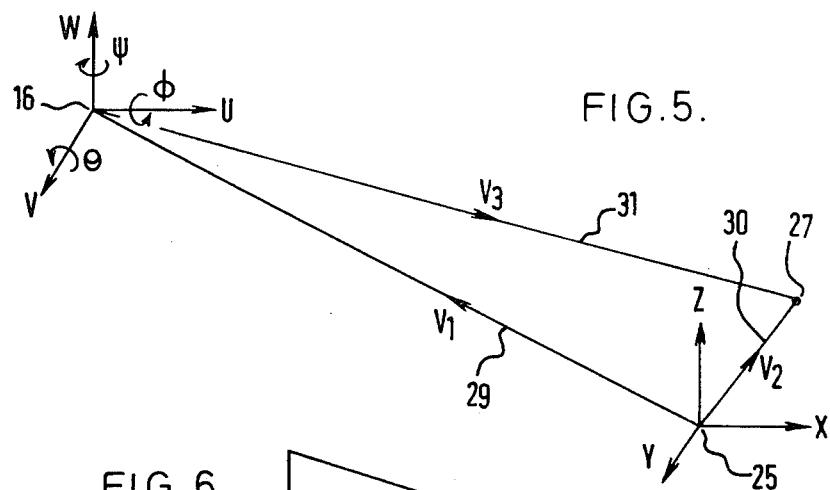
FIG. 5 shows the co-ordinate systems used for the complete derivation of the raster transformation.

The expressions for X and Y have next to be derived in a form which includes terms defining the observer's attitude in space and the position of the display plane raster point 28 through which projection occurs. FIG. 5 shows the co-ordinate systems used in the derivation. The (u,v,w) co-ordinate system 16 defines the observer's position; positive u is towards the front of the aircraft, positive v along the right wing and positive w is through the top. With no rotations applied to the aircraft co-ordinate system u is parallel to X, V is parallel to Y and W is parallel to Z. Vector $V_1$, 29 defines the location of the viewer's eye point in surface (X,Y,Z) co-ordinates. If vector $V_2$, 30 locates the intersection point 27 with respect to the surface origin, then:

$$V_2 = V_1 + V_3$$

where $V_3$, 31 is a vector from the origin of co-ordinates (u,v,w), 16 to point 27. Vector $V_3$ is required in surface (X,Y,Z) co-ordinates and must be related to the position of the raster scanning point. The attitude of the observer's simulated aircraft is described by the Eulerian angles $\psi$, $\theta$, $\phi$, representing heading, pitch and roll, respectively.

The point 27, described in observer co-ordinates must be expressed in unrotated ground co-ordinates. The rotations of the (u,v,w) co-ordinate system must first, therefore, be removed. To achieve this, $V_3$ is multiplied by three inverse rotation matrices, i.e.:

$$V_3 \text{(unrotated)} = \Psi^{-1} \theta^{-1} \Phi^{-1} V_3$$

where $$\Psi^{-1} = \begin{pmatrix} \cos\psi & -\sin\psi & 0 \\ \sin\psi & \cos\psi & 0 \\ 0 & 0 & 1 \end{pmatrix}$$

$$\theta^{-1} = \begin{pmatrix} \cos\theta & 0 & -\sin\theta \\ 0 & 1 & 0 \\ \sin\theta & 0 & \cos\theta \end{pmatrix}$$

$$\Phi^{-1} = \begin{pmatrix} 1 & 0 & 0 \\ 0 & \cos\phi & \sin\phi \\ 0 & -\sin\phi & \cos\phi \end{pmatrix}$$

and $\psi$, $\theta$, $\phi$ have the senses defined in FIG. 5.

Figure 6:
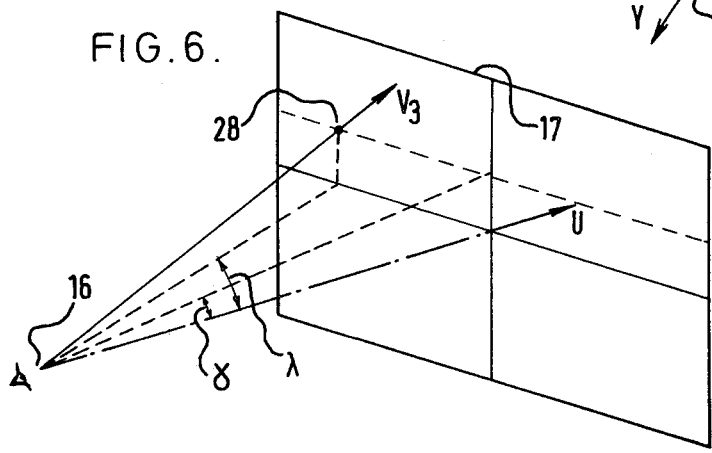
FIG. 6 represents a three-dimensional diagram which defines the position of a point on the display plane in terms of the horizontal and vertical angles made with the observer's eye.

FIG. 6 shows how, a point 28 on the display plane 17 is defined in terms of the two angles $\gamma$ and $\lambda$, where $\gamma$ is the frame scan angle and $\lambda$ the line scan angle. These angles both vary in discrete steps $-\gamma$ by the line angular spacing, $\lambda$ by the spacing between adjacent computed picture elements. Both of these angular increments are functions of $\gamma$ and $\lambda$, respectively. The limits of $\gamma$ and $\lambda$ are determined by the field of view, i.e.:

$$-\gamma_1 \leq \gamma \leq \gamma_2, \quad -\lambda_1 \leq \lambda \leq \lambda_2$$

If $V_3$ is defined in terms of these angles and then multiplied by the three inverse rotation matrices an expression for $V_3$ is obtained in (X,Y,Z) co-ordinates. Finally, if the vector addition:

$$V_2 = V_1 + V_3$$

is performed and the constraint that point 27 lies in the (X,Y) plane is introduced, the following two expressions result:

$$X = X_o - H(P_x/P_z),$$

$$Y = Y_o - H(P_y/P_z)$$

where $P_x = (\cos\theta + \sin\theta[\sin\phi \tan\lambda - \cos\phi \tan\gamma]) \cos\psi - (\cos\phi \tan\lambda + \sin\phi \tan\gamma) \sin\psi$ $P_y = (\cos\theta + \sin\theta[\sin\phi \tan\lambda - \cos\phi \tan\gamma]) \sin\psi - (\cos\phi \tan\lambda + \sin\phi \tan\gamma) \cos\psi$ $P_z = \sin\theta + (\cos\phi \tan\gamma - \sin\phi \tan\lambda) \cos\theta$ $X_o$ is the component of vector $V_1$ along the X axis; and $Y_o$ is the component of vector $V_1$ along the Y axis These equations are well known and, have been derived in different forms in the past for image generation systems using inverse perspective transformation. The form derived here is particularly suitable for digital implementation in that the raster-dependant variables are the tangents of the vertical and horizontal angles $\gamma$ and $\lambda$. Whereas the changes between values of $\gamma$ and $\lambda$ between lines and picture elements respectively are not constant, the changes between values of $\tan\gamma$ and $\tan\lambda$ are constant over the entire raster display. Hence, if H, $\psi$, $\theta$ and $\phi$ are considered to remain constant for the duration of a raster display frame, X and Y are functions of $\tan\gamma$ and $\tan\lambda$ alone, both of which vary in constant steps.

It is usually the case in flight simulation that the vector $V_1$, 29 defines not the position of the observer's eye point but some other point in the aircraft. This may be taken into account by modifying the $X_o$, $Y_o$ and H terms in the transformation equations; the X, Y and Z components of the vector joining the eye point to the vehicle point defined by $V_1$ are added to $X_o$, $Y_o$ and H, respectively.

Having derived the inverse perspective transformation in a suitable form, the method of generating a perspective image of the patterned surface is outlined. Three processes are involved and are set out below with reference to FIG. 7.

Figure 7:
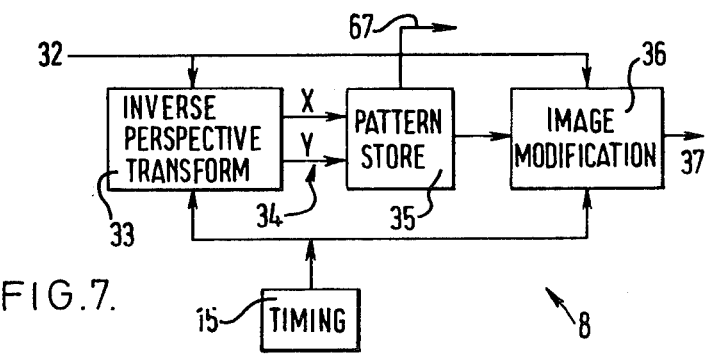
FIG. 7 is a block schematic diagram of a surface pattern generator used for the invention.

In FIG. 7. the diagram of the patterned surface generator, the flow of information is from left to right in the diagram, from the general purpose computer at 32 to an inverse perspective transform unit 33 and to an image modification unit 36. Under control of a timing unit 15, X and Y vector information at 34 is supplied by the inverse perspective transform unit 33 to address a pattern store 35, the output being supplied to the image modification unit 36 and thence by line 37 to the switch 11 of FIG. 2.

The three process steps referred to above are:
(1) The computation of the inverse perspective transformation 33. The results of this calculation are the two vectors X and Y at 34, defining the position of the surface intersection 27. New values of X and Y must be available at a rate equal to the display picture element occurrence rate;

(2) The use of these vectors 34 to address a store 35 containing a definition of the surface pattern; and (3) Modification of the perspective-transformed image produced 36 to remove defects caused by incorrect sampling at large X and Y distances of the intersection 27 from the nadir point 25 and to adjust the image to correspond to the current simulated brightness and visibility.

The transformation and image modification circuits 33 and 36 respectively, require information from the general purpose computer, 32 and timing pulses from the timing generator 15, see also FIG. 2.

The inverse perspective transformation must be computed for every value of tan $\lambda$ and tan $\gamma$ during a display frame. Tan $\lambda$ varies at the display element rate, thus governing the transformation computation rate. The expressions for $P_x$, $P_y$ and $P_z$ may be rewritten:

$$P_x = P_x(-\tan \gamma_1, -\tan \lambda_1) + P_{x\gamma} m \Delta \tan \gamma + P_{x\lambda} n \Delta \tan \lambda$$

$$P_y = P_y(-\tan \gamma_1, -\tan \lambda_1) + P_{y\gamma} m \Delta \tan \gamma + P_{y\lambda} n \Delta \tan \lambda$$

$$P_z = P_z(-\tan \gamma_1, -\tan \lambda_1) + P_{z\gamma} m \Delta \tan \gamma + P_{z\lambda} n \Delta \tan \lambda$$

where $P_x$, $P_y$ and $P_z$ ($-\tan \gamma_1$, $-\tan \lambda_1$), $P_{x\gamma}$, $P_{y\gamma}$ and $P_{z\gamma}$, $P_{x\lambda}$, $P_{y\lambda}$ and $P_{z\lambda}$ are constant for the duration of a display frame; $\Delta \tan \gamma$ and $\Delta \tan \lambda$ are constants and m and n vary over a display frame.

In the above three expressions, $P_x$, $P_y$ and $P_z$ may be seen to be two-dimensional linear functions, each described by an initial condition, for example $P_x(-\tan \gamma_1, -\tan \lambda_1)$ and two slopes, for example $P_{x\gamma}$ and $P_{x\lambda}\cdot\Delta \tan \lambda$ is constant and equal to the spacing between picture elements in a display which is at a unit distance along the u axis from the eye point, while $\Delta \tan \gamma$ is also constant and equal to the spacing of lines on this display. The value m is equal to the number of the line on which point 28 is situated, while n is the number of the picture element on this line where 28 lies.

Figure 8:
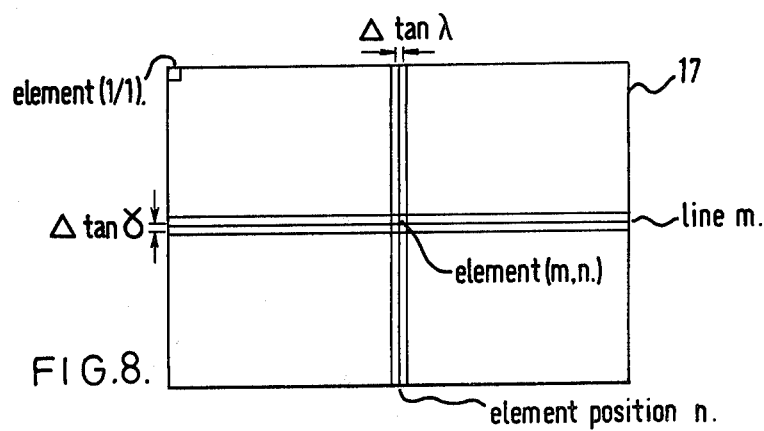
FIG. 8 is a diagram showing the element numbering scheme used in the description of the invention.

FIG. 8 illustrates this numbering method. $P_x$, $P_y$ and $P_z$ may thus be computed in an incremental manner. For example, considering the $P_x$ function, the increments are $P_{x\gamma}\Delta \tan \gamma$ and $P_{x\gamma}\Delta \tan \lambda$, where the first increment is added to the current value of $P_x$ every raster line and the second is added every picture element.

Figure 9:
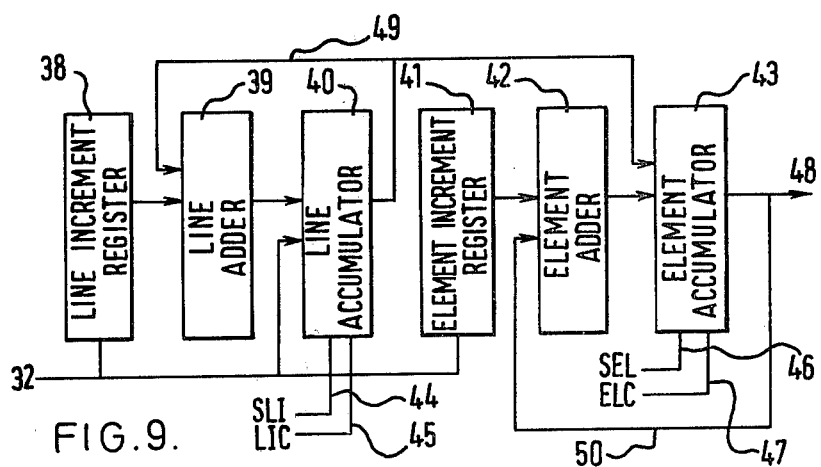
FIG. 9 is a block schematic diagram of a linear function generator used in the invention.

FIG. 9 shows a linear function generator suitable for the calculation of one of the above-mentioned functions, in block diagram form. In FIG. 9, a line accumulator, 40, is initially loaded with the number $P(-\tan \gamma_1, -\tan \lambda_1)$ where P is taken to represent any of the functions $P_x$, $P_y$ or $P_z$.

The line increment register 38 is loaded with $2P\gamma\Delta \tan \gamma$, where $P\gamma$ is taken to represent any of the quantities $P_{x\gamma}$, $P_{y\gamma}$ or $P_{z\gamma}$ and the factor is required where interlaced scanning is used as the distance between successively scanned lines is $2\Delta \tan \gamma$ on a unit display. The element increment register 41, is loaded with $P\lambda\Delta \tan \lambda$, where $P\lambda$ is taken to represent $P_{x\lambda}$, $P_{y\lambda}$ or $P_{z\lambda}$. These registers 38, 40, 41 are loaded with values computed by the general purpose computer and supplied along data channel 32. This loading is performed during the field fly back (or blanking) interval of the television raster scanning, in order not to disturb the function generator during picture generation periods. The timing pulses controlling the operation of the function generator are produced in such a manner that the function P is evaluated along the raster lines, that is picture element by picture element. During a line, the element increment is repeatedly added to the number held in the element accumulator 43, by the element adder 42 while at the start of each line, the line increment is added to the number held in the line accumulator 40 by the line adder 39 and the element accumulator 43 is loaded with this new value using path 49. At the end of a display field, that is one half of the lines of a display frame in an interlaced system, the line accumulator 40 is re-loaded to enable the computation to repeat during the next field. The initial condition $P(-\tan \gamma_1, -\tan \lambda_1)$ is different for the odd and even fields, as $-\tan \gamma_1$ differs by $\Delta \tan \gamma_1$ in the two fields.

For operation in synchronism with the display raster, the following control pulses are required:

SLI (44 in FIG. 9): Line Accumulator Input Select. This determines whether the line accumulator 40 receives its input from the line increment adder 39 or from the general purpose computer 32. SLI is controlled so that the general purpose computer is able to send a new initial condition to the line accumulator during field blanking periods. At other times, the line accumulator is fed from the line adder 39.

LIC (45): Line Accumulator Clock. This signal occurs at the start of every line and loads the line accumulator 40 from the source selected SLI 44.

SEL (46): Element Accumulator Input Select. This determines whether the element accumulator 43 receives its input from the element adder 42 or from the line accumulator 40 over path 49. During raster lines, the element accumulator receives its input from the element adder, while at the start of each line, it receives its input from the line accumulator.

ELC (47): Element Register Clock. This signal loads the element accumulator 43 from the source selected by SEL 46. During raster lines, this signal occurs at picture element rate.

In the form of the invention now described the function generators are realised with fully parallel arithmetic units. The line adder and accumulator do not have to work at high speed and may be realised with for example, Texas Instrumens 74LS283 adder and 74LS298 two-input register integrated circuits. The picture element rate in the present form of the invention is 15MH$_z$. This demands that the element adder and accumulator be constructed from high speed circuits, for example Texas Instruments 74S181 and 74S182 integrated circuits for the adder and Advanced Micro Devices 25S09 two-input register integrated circuits for the element accumulator.

In the form of the invention now described the surface pattern is chosen to be one-dimensional. That is variations in surface brightness occur along only one axis of the (X,Y) surface co-ordinate system 25. This does not reduce the generality of the method, which can alternatively be used for two-dimensional patterns without the use of different circuitry.

Figure 10:
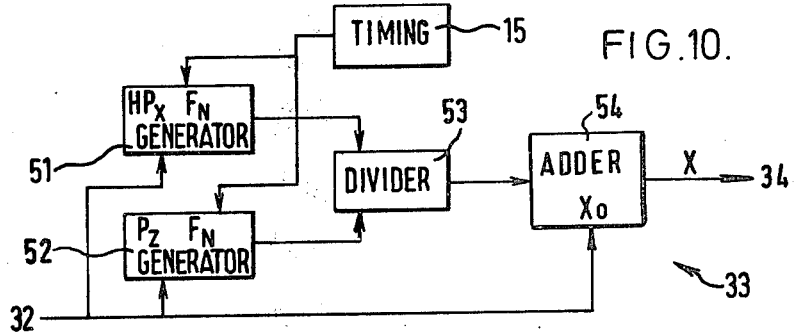
FIG. 10 is a block schematic diagram of an X inverse perspective transformation computer used in the invention.

FIG. 10 is a block diagram of the inverse perspective transformation for the X co-ordinate of the intersection 27. Two function generators, identical to that shown in FIG. 9, are used to compute the functions $HP_x$ and $P_z$, (51 and 52). The outputs from these function generators are divided in divider 53, whose output is added to the term $X_o$ in adder 54 to produce the final result, which obeys the relation:

$$X = X_o(-HP_x/P_z)$$

The initial conditions, the line increments and the element increments for the function generators 51 and 52 are all loaded from the general purpose computer over path 32, as is the displacement $X_o$, which is constant for the duration of a display field.

In the present form of the invention 24 bits are used both for the $HP_x$ and $P_z$ function generators. This number of bits is required for smooth movement of the image in response to simulated aircraft motion.

Once the intersection vector, X, has been computed, the pattern store can be accessed to produce the correctly transformed image. The resulting transformed pattern is only valid where the sample spacing, that is the distance between successive values of X, is such that a correct reproduction of the pattern can occur. As X increases in magnitude, the spacing between values of X likewise increases and the transformed pattern appears smaller in the display. At a certain point the transformed pattern ceases to accurately represent the pattern, but breaks up into Moiré patterns. This manifestation is removed in the image modification circuit, 36, FIG. 7.

In the form of the invention presently described, the object is the simulation of cloud "street" patterns. These are conveniently modelled as a sinusoidal surface brightness variation, with the peaks corresponding to the general cloud brightness level and the troughs corresponding to shadows. This pattern is one-dimensional, so that only one component of the intersection vector has to be calculated, and is repetitive. This last fact enables only one cycle of the pattern to be stored, which reduces the pattern storage capacity required and allows simplifications in divider 53, FIG. 10.

Figure 11:
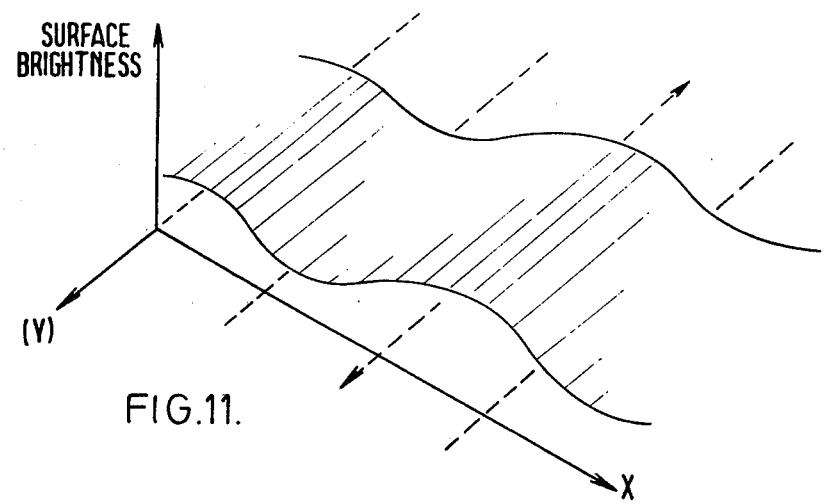
FIG. 11 is a section diagram which explains the modelling of the simulated surface pattern.

FIG. 11 is a diagram representing the surface pattern model for simulating cloud "street" patterns, according to the example chosen. The axes X, Y represent the plane 19, FIG. 3, according to the co-ordinates X, Y, Z, and the third rectangular axis represents surface brightness. Thus, the model, over the entire plane 19, corresponds to a corrugated sheet, the crests corresponding to the general cloud brightness and the troughs, shown shaded in the diagram, representing elongated shadow areas running parallel to the crests.

Given that 8 bits are sufficient to represent values of surface brightness and to ensure that "contouring" is not apparent on the display, the size of the pattern store can be determined. Taking X, 34 to be the store address, the 8 bit store output corresponds to the surface brightness. In order to store the maximum amount of information which is possible, describing a sinusoid, the largest brightness increment for a unit address increment must be one bit. The total store size required can then be shown to be approximately 800 words, for the storage of one cycle of a sinusoid. The nearest power of "2" is 1024, which defines the store size in a binary arithmetic based system. Due to the symmetry of the pattern, less than this number of words can be stored.

The output of the transformation computer 33 must therefore be a 10 bit number representing X 34, which is allowed to overflow to generate a repeating transformed pattern. $P_x$ and $P_z$ represent distances from the eye point to a scanning point in the unit display and are in the range ±1.24 for a display field of view of 48° by 60°. The result of the division of $HP_x$ by $P_z$ is therefore a number with the same scaling as H. Since actual altitudes are not important in an image generator of this type, because a given image could represent an infinity of altitude/pattern cycle dimension combinations, H is measured in pattern cycle units. Only the fractional part of the divider output is of interest. The integral part of X represents the distance of the intersection point 27 from the nadir point in pattern cycle units, while the fractional part represents the distance into a pattern cycle. The integral part can be ignored as each pattern cycle is identical. The fractional part of the quotient, which is modified by addition of the displacement $X_o$ of the nadir point from the ground origin 25 needs to be 10 bits long to fully address the cloud memory. The integral part of the displacement $X_o$ can also be ignored. The displacement addition 54 can thus be performed modulo 1.

It is required that new samples of the surface pattern be produced at the same rate at which picture elements are defined along the raster lines of the display. In the present form of the invention this is 15MHz. The divider circuit 53 must thus be able to produce outputs at this rate and accept inputs from the function generators 51 and 52 at the same rate. To meet these requirements the divider is organised using the technique known as "pipelining."

Pipelining is a form of parallel computation which is effective where the minimum system computation rate is a constraint. A calculation is pipelined by splitting it into steps, each of which can be performed by a logic network in one time period, for example 66 ⅔ nanoseconds for a 15MHz clock frequency.

Figure 12:
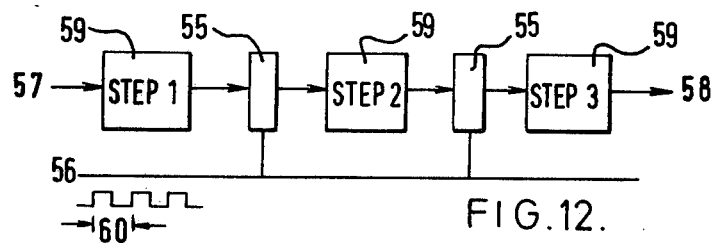
FIG. 12 is a diagram illustrating the structure of a pipelined system.

FIG. 12 is a diagram showing the structure of such a pipeline system. The system comprises three units 59, one for performing each of three steps, each unit 59 being separated from the next by a synchronisation register 55. Information flows through the pipeline system from the input 57 to the output 58. The synchronisation registers 55 are supplied with clock pulses on line 56, the clock pulses having a clock cycle width shown by the interval 60. At the end of each calculation step, the result must be resynchronised with the clock 56 in a synchronisation register 55. Many clocking schemes are possible and the synchronisation registers may be implemented in different forms. One of the simplest implementations uses a single phase clock and edge-triggered D-type registers (for example Texas Instruments 74S174 or 74S175) and is the one chosen for the form of the invention presently described.

The process of division may be viewed as one of repeated subtraction and/or addition of the divisor from/to the dividend. In a normal computer arithmetic unit, the same adder/subtractor performs all of the operations in a division under the control of a sequencer while in a pipelined divider, a separate adder/subtractor is present for each addition/subtraction. A pipelined system is fully parallel, as all computation units 59 are active at all times. The limitation is the total delay between the input 57 and the output 58 for one computation, given by the numbr of stages multiplied by the clock cycle width 60. This delay, in the present form of the invention is of the order of a few microseconds and has no significant effect on the operation of the image generator.

The first part of the divider consists of 12 adder/subtractors and synchronisation registers and generates a 12 bit remainder, using the well-known non-restoring method (see for example: Burks, Goldstine and Von Neumann's 1946 report, "Preliminary Discussion of the Logical Design of an Electronic Computing Instrument," reprinted in Bell and Newell's "Computer Structures: Readings and Examples," published by McGraw-Hill, 1971). As only the fractional part of the quotient is required, which can be generated from the remainder, the quotient bits resulting from the additions and/or subtractions of the first part of the divider may be discarded. The second part of the divider produces the fractional quotient from the remainder by performing a further division. Because of the smaller number of bits (two 12 bit inputs and a 10 bit output) needed, this part of the divider is conveniently constructed from a read-only memory reciprocal look-up table and a multiplier. Other methods could be used with equal success in the implementation of the divider.

The output from the pattern store is a correctly perspective-transformed image of the patterned surface represented as a sequence of digital brightness values each corresponding to a picture element of the display. However, certain parts of this image will contain incorrect information due to widely spaced pattern sampling at large values of X. The function of the image modification circuit 36 FIG. 7 is to remove these defects. This is achieved by reducing the contrast of the image in a direction perpendicular to the horizon in the dispaly plane, so that the image contrast is reduced to zero before incorrect information appears.

Figure 13:
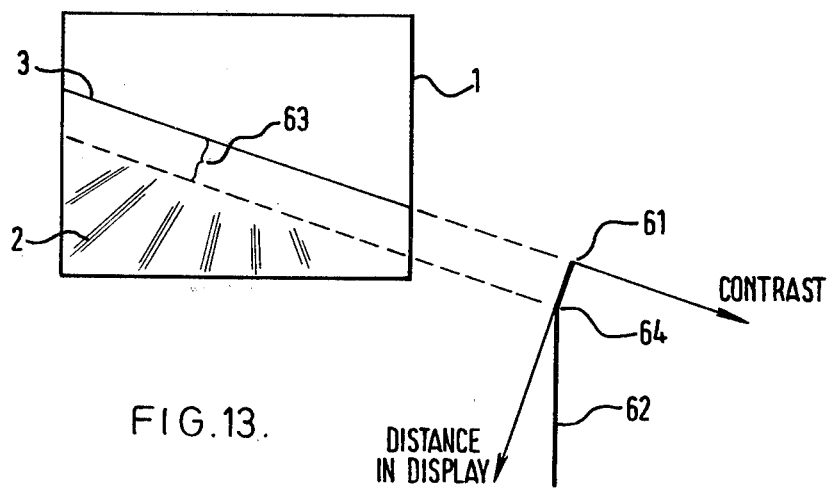
FIG. 13 is a diagram of a display illustrating the form of the contrast reducing function used.

FIG. 13 illustrates the form of this contrast reduction. FIG. 13 comprises two parts. That on the left is a diagram of a display, as shown in FIG. 1, the display plane boundary 1, perspective view 2 of the patterned surface and horizon 3 being similarly shown. However, the display 2 is separated from the horizon 3 by a region 63, extending the whole width of the horizon 3 and parallel thereto in which the contrast of the pattern simulated is reduced to zero. The right hand part of FIG. 13 is a contrast/distance diagram showing the horizon at 61, the band 63 having zero contrast value 64 and the linearly increasing contrast region 62 of the display portion 2. In region 2 of the display, the transformed pattern appears modified by the linear contrast reducing function 62. At line 64, parallel to the horizon, the contrast is reduced to zero and the pattern is eliminated. Region 62 appears with no pattern and is of brightness equal to the cloud pattern peak brightness. The contrast reducing function is produced in such a way that its effect is correct for all positions of the horizon in the display and responds to changes in pattern size due to changes in simulated aircraft altitude. For example, at increased altitude, the region where sampling errors start to occur is further from the horizon in the display, thus requiring distance 63 to be greater.

Figure 14:
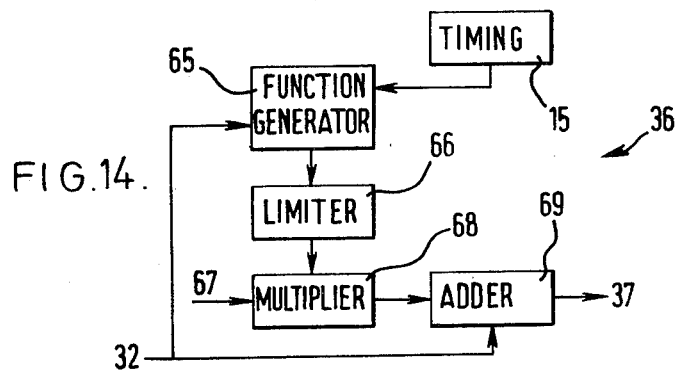
FIG. 14 is a block schematic diagram of the pattern contrast modifier used.

The contrast reducing function is a linear transformation of the display raster co-ordinates $\tan \lambda$, $\tan \gamma$, see FIG. 6, and can be shown to be:

$$C = C_o - C^1 (\tan \theta - \sin \phi \tan \lambda + \cos \phi \tan \gamma)$$

where
C is the value of the contrast reduction function
$C_o$ is a constant
$C^1$ is the slope of line 62
$\theta$ is the simulated aeroplane pitch angle
$\phi$ is the simulated aeroplane roll angle
$\tan \lambda$ is the display spot horizontal position
$\tan \gamma$ is the display spot vertical position FIG. 14 shows how this function is generated and used to modify the transformed pattern image.

FIG. 14 shows a pattern contrast modifier comprising a function generator 65 which is supplied with information from the general purpose computer 32, see FIG. 2, and clock pulses from the timing unit 15. The function generator is followed by a limiter 66, a multiplier 68, which also receives an input 67 from the pattern store 35 of FIG. 7, and an adder 69, which also receives an input from the general purpose computer 32. The output of adder 69 appears at 37, see also FIG. 7.

The C function is identical in form to the $HP_x$ and $P_z$ functions and may therefore be generated in an identical function generator 65. The general purpose computer 6, FIG. 2, computes the initial conditions and increments for this function and transfers them along path 32. 16 bits are sufficient for representation of the C function. The limiter 66 detects when the C function is negative and holds its output at zero. This corresponds to region 63 of FIG. 13. The limited contrast function is then multiplied with the pattern store output 67 in multiplier 68. Finally, the overall pattern brightness is added to this in adder 69. to produce the final 8 bit digital surface pattern 37.

The displayed horizon occurs at those points on the display plane where the vertical distance between the eye point 16, FIG. 4 and scanning point 28 is zero. In other words, it is the locus of points on the display where $P_z$ is zero. This function is positive for all points on the display representing sky which may be above or below the horizon, according to the pitch and roll angles, and is negative for those points representing the surface. The sign of this function may therefore be used to control a circuit which switches between the cloud 2 and sky 4 and 5 components of the display, FIG. 1.

Figure 15:
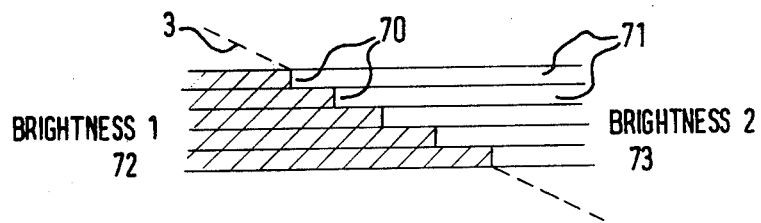
FIG. 15 is a diagram illustrating the "stairstep" phenomenon which may appear in a raster type display.

FIG. 15 shows the "stairstep" effect which results in a raster scanned display when the line brightness changes abruptly at a boundary line which is oblique to the direction of line scan. In FIG. 15, the broken line 3 indicates such an oblique boundary line corresponding to the horizon 3 of FIG. 1. Successive scan lines 71 are shown and the image comprises areas 72 and 73, respectively below and above the horizon 3, of different brightness. The stairstep produced are shown at 70.

In the general case, for a display of the form shown in FIG. 1, where the horizon 3 is inclined to the direction of line scan, different brightnesses and the stairstep effect will be present.

A well-known technique is available to overcome this stairstep effect, in which the boundary between brightness "1" 72 and brightness "2" 73 is made "soft" by blending the two brightnesses over a distance dependant on the horizon slope. The nearer the angle of the horizon is to that of the raster lines, the longer the distance is required to be.

Figure 16:
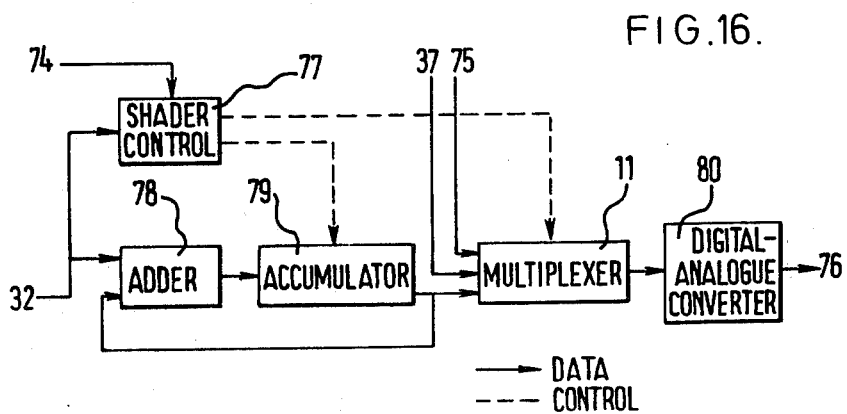
FIG. 16 is a block schematic diagram showing the horizon logic.

FIG. 16 shows in block diagram form, the circuits used for such blending and switching between the pattern 2 and sky 4 of FIG. 1.

Figure 17:
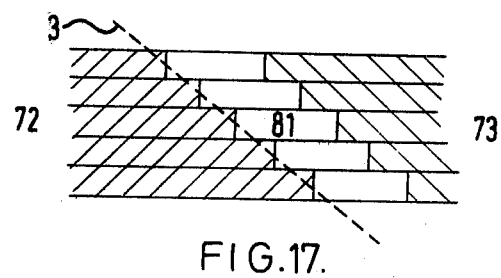
FIG. 17 is a diagram of a part of a raster type display showing the regions of blending adjacent the horizon.

FIG. 17, which is to be compared with FIG. 15, shows the effect produced in that, between the area 72 of brightness "1" and the area 73 of brightness "2", for a controlled line length adjacent the horizon line 3, there is formed a blending region 81.

Returning to FIG. 16 a shader control logic unit 77 detects when a transition between sky 4 and cloud 2, or vice versa, FIG. 1, occurs by use of the sign of the $P_z$ function 74. Shading then occurs over a number of picture elements determined by the general purpose computer and loaded into the control logic unit 77 over the path 32. The brightness increment between elements in the region 81 is also determined by the general purpose computer and loaded into a shader adder unit 78 over the path 32. A multiplexer 11 also under the control of the shader logic unit 77 switches between the pattern image 37 the sky image 75 and the blended region held in a shader accumulator unit 79. The final image output from the multiplexer 11 is converted into displayable form by a digital-to-analogue converter 80. The output 76 from the digital-to-analogue converter 80 is fed to the raster scan display device.

Similarly, to the constant reduction function, C, the variable brightness region of the sky is modelled in the display plane. A linear transformation is thus needed to map this onto the display raster.

Figure 18:
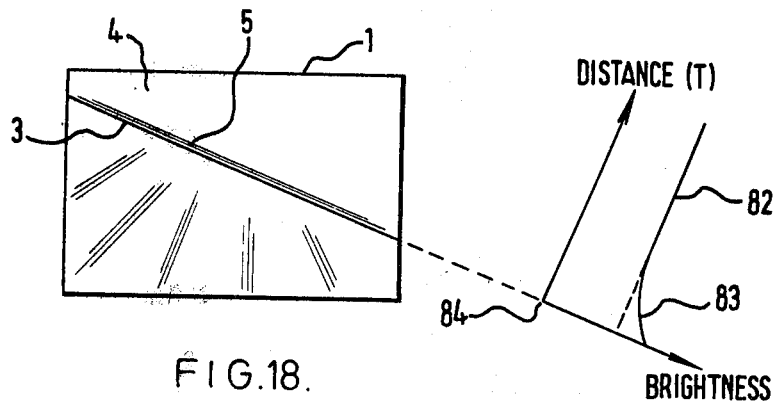
FIG. 18 is a diagram of a display showing the form of sky model used.
Figure 19:
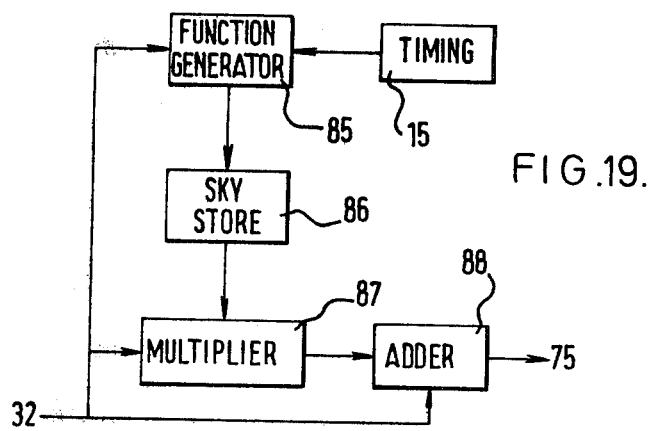
FIG. 19 is a block schematic diagram of the sky image generator used.

FIG. 18, which may be compared with FIG. 13 shows how the sky is modelled. The sky image consists of a constant brightness region 4 and 82 and a variable brightness region 5 and 83. The variable brightness region is a one-dimensional pattern which varies in a direction perpendicular to the horizon, shown as the "T" direction in FIG. 18. This variable brightness region may be stored in a manner similar to that used for the surface pattern and accessed by a vector representing the distance of the scanning spot 28 from the horizon in the display plane. (This is not to be confused with distance represented by the $P_z$ vector). The transformation yielding this result may be simply shown to be:

$$T = K(\tan\theta - \sin\phi \tan\lambda + \cos\phi \tan\gamma)$$

where $\theta$, $\phi$, $\tan\lambda$ and $\tan\gamma$ have the same meanings as in the last equation, and K is a constant converting the unit display to a display with unit vertical picture element spacing and is equal to $(1/\Delta \tan\gamma)$ The T function again is identical in form to the $HP_x$ and $P_z$ functions and may be computed in an identical linear function generator. FIG. 19 shows a block diagram of the sky image generator. A two-dimensional linear function generator 85 is loaded with initial conditions and increments from the general purpose computer 6 over the path 32, to correctly generate the T function in synchronism with the display raster scanning. A sky store 86 holds the variable brightness profile representing the lower sky and contains logic to recognise values of T exceeding the upper boundary of the variable brightness region and to produce a zero output for these cases. A multiplier 87, set up by the general purpose computer 32 modifies the amplitude of the sky store output and an adder 88 similarly set up, adds in the brightness of the constant brightness region of the sky image 4. The final output at 75 is directed to the multiplexer 11, FIG. 16, for selection by the shader control logic. A realistic sky image may be produced by defining the variable luminance portion as:

$$B = \exp(-KT^2)$$

Where

B is the brightness of the variable luminance part of the sky image, and

K is a constant.

A 20-bit function generator suffices for generation of the T function, and a 64 line length for the sky variable luminance region produce a realistic sky effect on either a 625 or a 1023 line raster display.

What we claim is:

1. Visual display apparatus for a ground-based craft flight simulator including a flight computer, comprising raster scan type display means for viewing by a trainee pilot observer, synthetic image generating means for supplying to the display means a signal representing an image of sky, horizon and a simulated patterned surface extending to the horizon, said patterned surface being displayed in true perspective in accordance with the simulated altitude and position in space relative thereto of the craft simulated and a general purpose programmable computer connected to interface the said flight computer and the said synthetic image generating means, said synthetic image generating means including discrete surface pattern generator, sky image generator and horizon logic units, the general purpose computer receiving as an input flight related data from the flight computer, being programmed to continuously compute functions of said flight related data and being connected to supply values of said functions to each of the units of the synthetic image generating means, said surface pattern generator including an inverse perspective transformation computer and a digital pattern store, the pattern store holding a single pattern cycle of a repetitive pattern for patterning said patterned surface in one dimension thereof, said sky image generator providing a signal output for the display means representative of a variable brightness portion of sky, both surface pattern and sky image generators supplying signals to switch means for selectively supplying to the display means either the signal representative of the patterned surface or the signal representative of the variable brightness portion of sky, continuously during the raster scan of the display means.

2. Visual display apparatus as claimed in claim 1, in which X and Y vector information relating to the two dimensions of the said simulated patterned surface is supplied by the inverse perspective transform unit to address the pattern store, the output from which is supplied to the image modification unit.

3. Visual display apparatus as claimed in claim 2, in which the image modification unit receives data defining a perspective-transformed simulated pattern image from the said pattern store, the data output of the said general purpose computer, and raster display timing pulses and supplies simulated patterned surface signals suitable for the said display means, by way of the said switch means.

4. Visual display apparatus as claimed in claim 3, in which the said inverse perspective transform unit for X vector information comprises two function generators, both receiving the data output of the said general purpose computer, both receiving the said raster display timing pulses and both supplying outputs to a divider, the output from which divider is added to the earlier value of X ($X_o$) in a following adder, which adder is supplied with the data output of the said general purpose computer and supplies the incremented value of the X vector for addressing the said pattern store.

5. Visual display apparatus as claimed in claim 4, in which, as the X vector value increases so that the simulated pattern surface diminishes in size in the said perspective display of raster scan display means, the said image modification unit functions to prevent the generation of a Moire pattern.

6. Visual display apparatus as claimed in claim 5, in which the image modification unit comprises a function generator, which receives the data output of the said general purpose computer and the raster display timing pulses, is followed by a limiter and by a multiplier, which multiplier receives an input from the said pattern store, the multiplier output being supplied to an adder, which adder also receives the data output of the said general purpose computer, the adder output being supplied to the said switch means.

* * * * *